(12) United States Patent
Walters et al.

(10) Patent No.: US 7,277,882 B1
(45) Date of Patent: Oct. 2, 2007

(54) SYSTEM AND METHOD FOR NETWORK ELEMENT DATABASE POPULATION

(75) Inventors: Jon Timothy Walters, Chattanooga, TN (US); Roberta R. O'Steen, Senoia, GA (US); Charles Y. Hodges, Jr., Hoover, AL (US); Leslie Huff, Lawrenceville, GA (US); Linda Reddick, Marietta, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 357 days.

(21) Appl. No.: 10/109,912

(22) Filed: Mar. 29, 2002

(51) Int. Cl.
*G06F 7/00* (2006.01)
*G06F 17/30* (2006.01)

(52) U.S. Cl. .......................... 707/3; 707/100; 709/219
(58) Field of Classification Search ................ 707/1–3, 707/104.1, 100; 370/410; 709/219; 379/265.09
See application file for complete search history.

(56) References Cited

U.S. PATENT DOCUMENTS

| | | | |
|---|---|---|---|
| 6,192,052 B1 * | 2/2001 | Christie | 370/410 |
| 6,343,290 B1 * | 1/2002 | Cossins et al. | 707/10 |
| 6,349,334 B1 * | 2/2002 | Faupel et al. | 709/224 |
| 6,549,940 B1 * | 4/2003 | Allen et al. | 709/219 |
| 6,763,104 B1 * | 7/2004 | Judkins et al. | 379/265.09 |
| 6,892,233 B1 * | 5/2005 | Christian et al. | 709/223 |

OTHER PUBLICATIONS

*Website:* Telecordia Technologies, "Fault Management—Telecordia™ Element Communicator," © 1998-2002 Telecordia Technologies, Inc. (Printout Sep. 16, 2002).
"Telecordia™ Transport Element Activation Manager: The Next Generation Element Management System For Activating Multivendor Transport Networks," © 2000 Telecordia Technologies, Inc.

* cited by examiner

*Primary Examiner*—Sam Rimell
(74) *Attorney, Agent, or Firm*—Withers & Keys, LLC

(57) ABSTRACT

In an illustrative method for populating a database for use in automated administration of network elements, data that describes network elements in a telecommunication system is aggregated from existing systems. The aggregated data is formatted for loading into the telecommunication system. The formatting may include, for example, creating circuit data that identifies circuits, or groupings, that exist in the telecommunication system. The formatting may also comprise formatting network element data to conform to a new database format. Thereafter, the network element data is loaded into the new database. This step may comprise loading the circuit data and the network element data. Finally, the results of the load operation, including any error messages, are retrieved.

14 Claims, 4 Drawing Sheets

SYSTEM AND METHOD FOR NETWORK ELEMENT DATABASE POPULATION

FIELD OF THE INVENTION

The present invention relates generally to telecommunications systems, and more particularly, to systems and methods for managing network elements.

BACKGROUND

Telecommunication systems comprise numerous network elements, such as switches, multiplexers, etc., which operate together to provide telephone service, digital subscriber lines, etc. Generally, the number of network elements in a telecommunication system is very large—on the order of tens of thousands. Accordingly, the companies that provide telecommunication services have developed systems to track information about the many network elements that have been deployed. Indeed, over the years, telecommunication service providers have installed numerous systems for tracking various aspects of the network elements in their systems.

Recently, systems have been developed that allow for automated remote control of network elements. Using these systems, administrators of telecommunication systems can quickly and easily perform system administrative tasks such as, for example, provisioning. However, before a system for remote control of network elements can be used, typically the system must be loaded with data regarding the network elements that are to be managed. Of course, the network element data that is needed for these systems is frequently located in the legacy systems that the telecommunication companies have previously installed. Unfortunately, there are not presently available systems and methods for populating new systems with the network element data from the installed legacy systems.

SUMMARY

Accordingly, Applicants have developed systems and methods for loading network element data into a database for use by a system for automated administration of network elements. In an illustrative method, data that describes network elements in a telecommunication system is aggregated from existing systems. The aggregated data is formatted for loading into the telecommunication system. The formatting may include, for example, creating logical groupings of network elements that exist within the telecommunication system. The formatting may also comprise formatting network element data to conform to a new database format. Thereafter, the grouping data and the network element data are loaded into the database. Finally, the results of the load operation, including any error messages are retrieved.

BRIEF DESCRIPTION OF THE DRAWINGS

Other features of the illustrative system and method will be further apparent from the following detailed description of presently preferred exemplary embodiments taken in conjunction with the accompanying drawings, of which.

DETAILED DESCRIPTION

Figure 1:
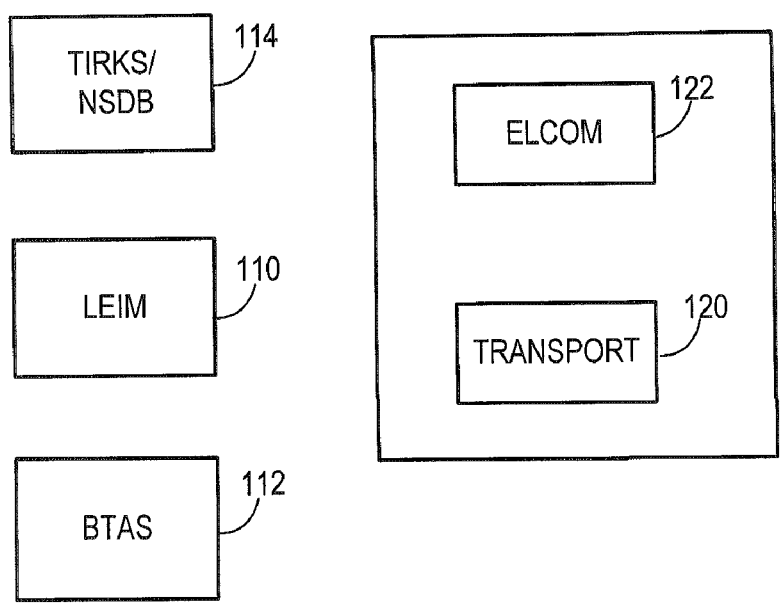
FIG. 1 is a diagram of systems used to administer a telecommunication system.

FIG. 1 is a block diagram representing systems for use in managing network elements in a telecommunications system. Loop Equipment Inventory Module System (LEIMs) 110 comprises a database of the network elements that are employed to provide service between central offices (CO's) and customer locations. Telemetry Assignment System (TAS) 112 comprises a database of numbers that have been assigned to network elements to uniquely identify each network element. The Trunk Integrated Record Keeping System (TIRKS)/Network and Services Database (NSDB) 114 has two functions. It is used to assign and maintain records of facilities and equipment associated with services requiring design transmission conditioning. It also stores customer and circuit data for special services, message carrier, and enhanced non-design services.

Generally, LEIMs 110, TAS 112, and TIRKS/NSDB 114 are data tracking and management systems. While they provide for managing information relevant to the network elements, they are not operable to interact with the network elements to implement administrative functions. Conversely, Transport 120 and ELCOM 122, which are software systems produced by Telcordia, may be employed to automatically implement administrative functions such as updating network element provisioning. However, before these systems can be used to administer a system, they must be loaded with data regarding the network elements. A method for loading network element data from systems such as for example, LEIMs 110, TAS 112, and TIRKS/NSDB 114 into an automated administration system such as for example, ELCOM is described below in connection with FIG. 3.

Figure 2:
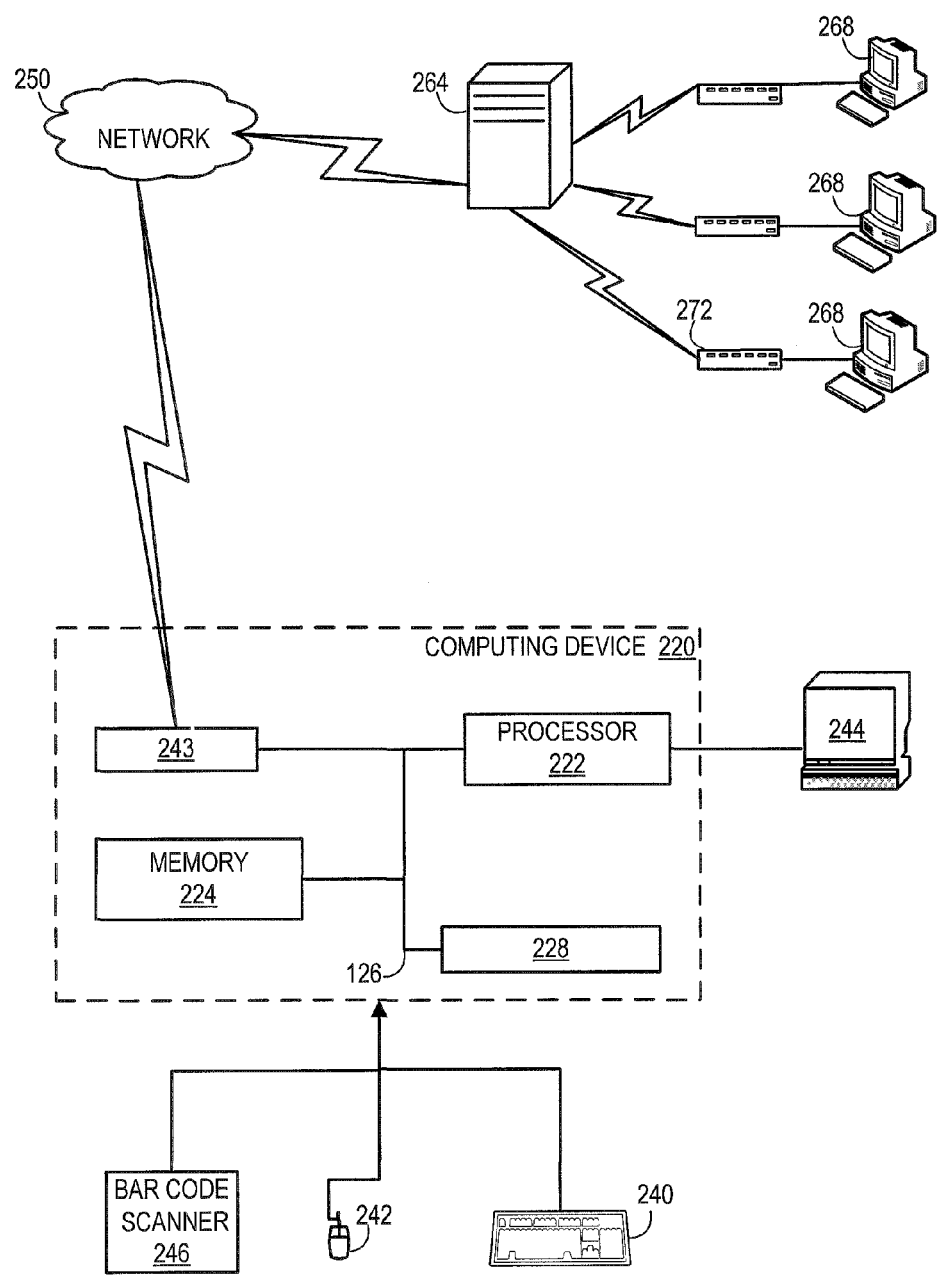
FIG. 2 is a diagram of a system for use in implementing a method for populating a database.

FIG. 2 is a diagram of a generic computing system in which an illustrative method for loading data may be implemented. As shown in FIG. 2, computing device 220 includes processor 222, system memory 224, and system bus 226 that couples various system components including system memory 224 to processor 222. System memory 224 may include read-only memory (ROM) and/or random access memory (RAM). Computing device 220 may further include hard-drive 228, which provides storage for computer readable instructions, data structures, program modules, data, and the like. A user (not shown) may enter commands and information into the computing device 220 through input devices such as a keyboard 240, a mouse 242, and a bar code scanner 246. Display device 244 may also include other devices such as a touch screen, a light pen, a grid of light beams, or the like for inputting information into processor 222. A display device 244, such as a monitor, a flat panel display, or the like is also connected to the computing device 220 or output. Communications device 243, which may be a modem, network interface card, or the like, provides for communications over network 250. Processor 222 can be programmed with instructions to interact with other computing systems so as to perform the methods described below. The instructions may be received from network 250 or stored in memory 224 and/or hard drive 228. Processor 222 may be loaded with any one of several computer operating systems such as WINDOWS NT operating system, WINDOWS 2000 operating system, LINUX operating system, and the like.

As shown in FIG. 2, computing device 220 may be connected to computer network 250. Server 264 is likewise operable to communicate with other computing devices over network 250. Network 250 may be the Internet, a local area network, a wide area network, or the like. Server 264 may communicate e-mails, web pages, and other data. Server 264 may be operated by an ISP, a corporate computer department, or any other organization or person with a server connected to network 250. Server 264 is accessible by client stations 268 from which users may send and receive data and browse web pages. Client stations 268 may connect to servers via a local area network (not shown) or using a remote connection device 272 such as, for example, a modem or network interface card.

Figure 3:
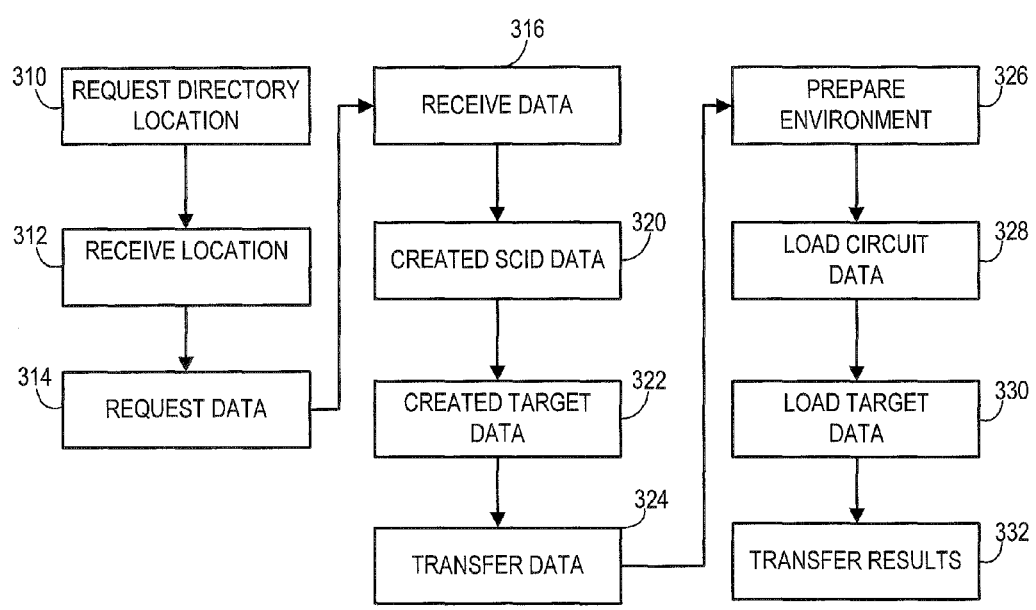
FIG. 3 is a flow chart of a method for populating a database.
Figure 4:
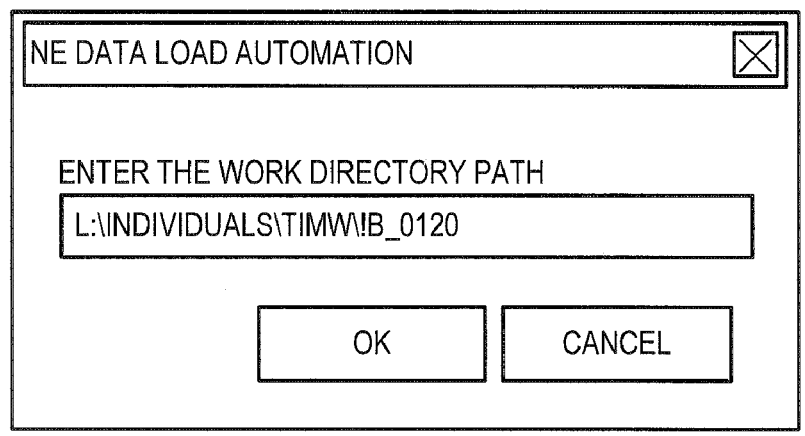
FIG. 4 is a diagram of a display for retrieving a directory location for use in a method for populating a database.

The illustrative computing system described above may be used to implement an illustrative method for preparing data for use in a system for automatically performing administrative tasks such as is described in FIG. 3. As shown, at step 310, a request is made for the directory location of the network element related data that is to be loaded into the administrative system. For example, a screen such as disclosed in FIG. 4 may be displayed to the user on display device 244 whereby the user may input a directory location. At step 312, the directory location of the network element data is received. For example, a user input identifying a directory location and made using keyboard 240 or mouse 242 may be received into device 220.

At step 314, the data identifying network elements in a telecommunication network is requested, and at step 316 is received. For example, a command may be issued by processor 222 to read data from memory 224 or hard drive 228. The data identifying networks may include, for example, the following:

1. Upstream Target ID
   represents the NE Identifier as it relates to TIRKS/NSDB
   Example: ACWOGAU004701CAB01A
2. Downstream Target ID
   represents the NE Identifier as it relates to the actual Network Element
   Example: ACWOGAU0047LTS032341
3. NE SCID
   represents Network Element SONET Carrier ID which is used for grouping NEs together into subgroupings
   Example: NGM60L
4. GNE SCID
   represents Network Element SONET Carrier ID which is used for grouping NEs together, and in particular to identify the group of which the Gateway NE is a member
   Example: NGM89L
5. NE Type
   represents a manufacturer and model
   Example: DDM2000 (OC3)
6. Software/Firmware Release
   represents the software/firmware release found in the NE
   Example: 7.2.7
7. GNE/SUB Indicator
   specifies if the NE is a Gateway (GNE) or Subtending NE (SUB)
8. GNE TID
   represents the Target ID of the Gateway NE (GNE)
   Example: ACWOGAMADM2032220
9. X.121 Address
   represents the communications address of the GNE
   Example: 404-555-1975

At step 320, logical grouping data is created from the network element data. In an exemplary embodiment, creating the groupings comprises creating SCID (SONET Carrier ID) data. The SCID data specifies a logical grouping of network elements (members of a SONET ring), which must be loaded prior to loading the target data as specified at step 322. The grouping data created from the above exemplary network element data, specifically item number 4, might appear as follows:

```
/group
=target_group_name (PK)        gm891
=source_identification         y
=duplicate_detection           y
=aging_timer                   1
=group_logging                 y
```

In this particular example, the logical grouping is defined using data items target_group_name, source_identification, duplicate_detection, aging_timer, and group_logging. Item number 4 from the exemplary network element data above provides a value for the target_group_name. Values for the remaining data items that define the logical grouping, i.e. source_identification, duplicate_detection, aging_timer, and group_logging, may be identified by network element data items or may be set to default values.

At step 322, target data, which comprises original network element data that has been formatted for use in a particular administrative system, is created from the original set of network element data. Default values are assigned to data items based upon the network element model and target class of the network elements. For example, target data formatted from the above exemplary network element data may appear as follows:

```
/target
=target_id(PK)                 acwogau004701cab01a
=target_type                   ne
=group_name(SP)                ngm891
=surveillance_mode             direct
=target_class(SP)              subtending
=technology                    adm
=product_name                  DDM2000-OC3
=supplier_name                 Lucent
=product_release               ALL
=notes                         Entered by db_reload: Dec. 18, 2001
/channel
=target_id(PK)                 acwogau004701cab01a
=channel_id(PK)                sub
=model                         att_ddm_oc3_sub
=raw_message_logging           n
=init_script                   y
=channel_status                enable
=ne_user_ID                    SNC01
=ne_password                   SNC-123
=monitor_timer                 0
=monitor_startup               out of service only
=gateway_target_id(SP)         acwogamadm2032220
=gateway_channel_id            01
```

As shown, values for the target data items are taken from the original network element data items or are given default values. For example, the value for the target_id variable has been set to the Upstream Target ID network element data item value shown above. Other data items such is supplier_name have been set to a default value.

At optional step 324, the circuit data and the target data are transported to a computer that is operable to automatically perform administrative functions. For example, at step 324, the circuit data and the target data may be transferred from device 220 over network 150 to server 164 wherein a system such as ELCOM for performing administrative operations resides. At optional step 326, the environment of the computer on which the data is to be loaded is configured for operation of the load routine. Step 326 may comprise, for example, setting environment variables on the host computer. At step 328, the circuit data is loaded into a database for use by a system for automatically implementing network element administrative functions. For example, device 220 may cause the circuit data to be loaded into a database on server 264 for use by ELCOM 122. At step 330, the target data is loaded into a database for use by a system for automatically implementing network element administrative functions. For example, device 220 may cause the target data to be loaded into a database on server 264 for use by ELCOM 122. At step 332, any results from the loading processes of steps 328 and 330, such as result logs and error logs, are retrieved. For example, results and error logs may be transferred from server 264 to device 220.

Thus, illustrative systems and methods for populating a database for use by a system for automatically performing network element administrative tasks have been disclosed. Systems and methods in accordance with the invention facilitate the loading of data that otherwise might need to be loaded manually at great effort and expense. Thus, systems and methods in accordance with the invention mark an advance in the administration of telecommunication networks.

Those skilled in the art understand that computer readable instructions for implementing the above-described processes, such as those described with reference to FIG. 3 can be generated and stored on one of a plurality of computer readable media such as a magnetic disk or CD-ROM. Further, a general purpose computer such as that described with reference to FIG. 2 may be arranged with other similarly equipped computers in a network, and may be loaded with computer readable instructions for performing the above described processes. Specifically, referring to FIG. 2, microprocessor 222 may be programmed to operate in accordance with the above-described processes.

While the invention has been described and illustrated with reference to specific embodiments, those skilled in the art will recognize that modification and variations may be made without departing from the principles of the invention as described above and set forth in the following claims. For example, while the invention has been described in connection with ELCOM, the systems and methods may be employed to populate databases for use with other systems as well. Accordingly, reference should be made to the appended claims as indicating the scope of the invention.

What is claimed is:

1. A method for loading network element data from a first database resident in a first computing device to a second database resident in a second computing device, comprising:

receiving network element data from the first database identifying network elements in a communications network, the network elements being individual pieces of equipment;

creating from the network element data grouping data identifying logical groupings of network elements that exist in the communications network;

creating from the network element data target data identifying the network elements;

reformatting the network element data and the target data for loading into the second database; and loading the reformatted network element data and target data into the second database for use by the second computing device for provisioning network elements, wherein creating grouping data comprises creating data identifying network elements that are members of a SONET ring by specifying at least a SONET ring carrier ID (SCID) among the members of the SONET ring as a name for the logical grouping.

2. The method of claim 1, further comprising requesting a directory location of the network element data to be loaded.

3. The method of claim 2, further comprising retrieving the network data from the directory location.

4. The method of claim 1, wherein reformatting the network element data and the target data is accomplished by a method selected from a group of methods comprising at least one of renaming a data element changing the capitalization of a data element and assigning default values to a data element.

5. The method of claim 1, further comprising retrieving data identifying the results of loading the network element data and target data.

6. A computer readable medium having computer executable instructions thereon for performing the following:

receiving network element data from a first database identifying network elements in a communications network, the network elements being individual pieces of equipment;

creating from the network element data grouping data identifying logical groupings of network elements that exist in the communications network;

creating from the network element data target data identifying the network elements;

reformatting the network element data and the target data for loading into a second database; and loading the network element data and target data into the second database for use by a system for provisioning network elements, wherein creating grouping data comprises creating data identifying network elements that are members of a SONET ring by specifying at least a SONET ring carrier ID (SCID) among the members of the SONET ring as a name for the logical grouping.

7. The computer readable medium of claim 6, further comprising executable instructions stored thereon for requesting a directory location of the network element data to be loaded.

8. The computer readable medium of claim 7, further comprising executable instructions stored thereon for retrieving the network data from the directory location.

9. The computer readable medium of claim 6, wherein the logical grouping is defined by data items selected from a group of data items comprising at least one of target_group_name, source_identification, duplicate_detection, aging_timer and group_logging.

10. The computer readable medium of claim 6, further comprising executable instructions stored thereon for retrieving data identifying the results of loading the network element data and target data.

11. A system for loading network element data, comprising:

a processor operable to execute computer executable instructions;

a memory, said memory having stored therein computer executable instructions for performing the following:

receiving network element data identifying network elements in a communications network, the network elements being individual pieces of equipment;

creating from the network element data in a first database grouping data identifying logical groupings of network elements that exist in the communications network;

creating from the network element data target data identifying the network elements;

reformatting the network element data and the target data for loading into a second database; and loading the network element data and target data into the second database for use by a system for provisioning network elements, wherein creating grouping data comprises creating data identifying network elements that are members of a SONET ring by specifying at least a SONET ring carrier ID (SCID) among the members of the SONET ring as a name for the logical grouping.

12. The system of claim 11, wherein said memory has stored therein computer executable instructions for requesting a directory location of the network element data to be loaded.

13. The system of claim 12, wherein said memory has stored therein computer executable instructions for retrieving the network data from the directory location.

14. The system of claim 11, wherein said memory has stored therein executable instructions for retrieving data identifying the results of loading the network element data and target data.

* * * * *